Dec. 27, 1960 R. SÖMMER 2,966,067
REVERSIBLE TRANSMISSION SYSTEM
Filed Nov. 18, 1959 2 Sheets-Sheet 1

Reinhold Sömmer
INVENTOR.

BY *Karl F. Ross*
AGENT.

Dec. 27, 1960 R. SÖMMER 2,966,067
REVERSIBLE TRANSMISSION SYSTEM
Filed Nov. 18, 1959 2 Sheets-Sheet 2

Reinhold Sömmer
INVENTOR.

United States Patent Office 2,966,067
Patented Dec. 27, 1960

2,966,067
REVERSIBLE TRANSMISSION SYSTEM

Reinhold Sömmer, Nordhausen, Harz, Germany, assignor to VEB Schlepperwerk Nordhausen, Nordhausen, Harz, Germany, a corporation of Germany Filed Nov. 18, 1959, Ser. No. 853,943

Claims priority, application Germany Dec. 22, 1958

20 Claims. (Cl. 74—343)

My present invention relates to speed-change transmissions for automotive vehicles and, more particularly, to a reversible multi-speed transmission system.

It has been the practice heretofore to equip certain types of motor vehicles, such as dump trucks, spreaders, bulldozers, self-propelled rail vehicles and the like, with speed-changing devices adapted to drive the vehicles with a maximum number of forward and reverse speeds in order to obtain maximum vehicle efficiency. Accordingly, these vehicles generally were provided with sliding gear drives having special reversing gears associated therewith to accomplish the requisite speed-changing operations. The reversing gears were usually built either as spur gears or as bevel differential gears and were frequently fitted with a claw coupling. Conventional transmission systems of the above character involved relatively intricate construction with consequent high manufacturing costs; frequently, the systems were encumbered with a high-speed gear for direct drive in both the forward and the reverse directions, although such a gear was actually necessary only for forward motion.

It is an object of the present invention to provide a simple, compact and economical speed-changing transmission system for automotive vehicles.

Another object of my invention is the provision of a reversible automotive transmission requiring a minimum number of reversing gears and shifting means therefor.

The above objects are realized by a novel combination of features described in part in my co-pending applications Ser. Nos. 727,922, now Patent No. 2,920,504 dated January 12, 1960, and 727,942, both filed April 11, 1958.

A transmission system according to this invention comprises a plurality of shafts including an input shaft, an output shaft, and an auxiliary shaft. The auxiliary shaft carries a pair of substantially identical reversing gears rigidly secured thereto, one of which is continuously engaged by an idler gear on a further shaft. The input shaft is provided with an input gear shiftable between several positions axially spaced along the input shaft. The input gear is adapted to apply the input torque from a suitable driving engine to the auxiliary shaft either by direct engagement with one of its two reversing gears or by engagement with the idler gear which is in constant mesh with the other reversing gear. In a first position the input gear causes the auxiliary shaft to rotate in a forward direction, while in a second position the latter is rotated in the opposite sense. The torque thus applied to the auxiliary shaft is then transmitted to the output shaft through a conventional gear-shifting mechanism comprising a plurality of gears of progressively greater diameters secured to the auxiliary shaft at axially spaced locations for co-operation with a similar number of axially displaceable gears carried on the output shaft. In the aforementioned arrangement, wherein equal numbers of forward and reverse speeds may be obtained, the number of gears required for speed-changing and reversing purposes is no greater than the number of gears contained in a conventional system having the same number of forward speeds but only one reverse speed.

Another feature of the present invention resides in the provision of means for obtaining an additional, high-speed forward drive by directly coupling the input shaft to the output shaft, thus by-passing the speed-changing gears carried on the auxiliary shaft. Advantageously, the direct coupling action may be accomplished by shifting the input gear to still another axially spaced position along the input shaft.

A further feature of my invention resides in the provision of gear-shifting means including a pair of shift levers, one adapted to displace the input gear for switching the transmission from forward drive to reverse and vice versa, the other serving to determine the speed ratio for either type of motion by operating the graduated shifting gears in the conventional manner. With both shift levers in neutral, the second lever is operable to engage the input gear for displacing it to its direct-drive position, this movement at the same time disengaging the input gear from the first lever and locking the latter in an inoperative position.

The above and other objects, features and advantages of the present invention will become more readily apparent from the following description, reference being made to the accompanying drawing in which.

Figure 1:
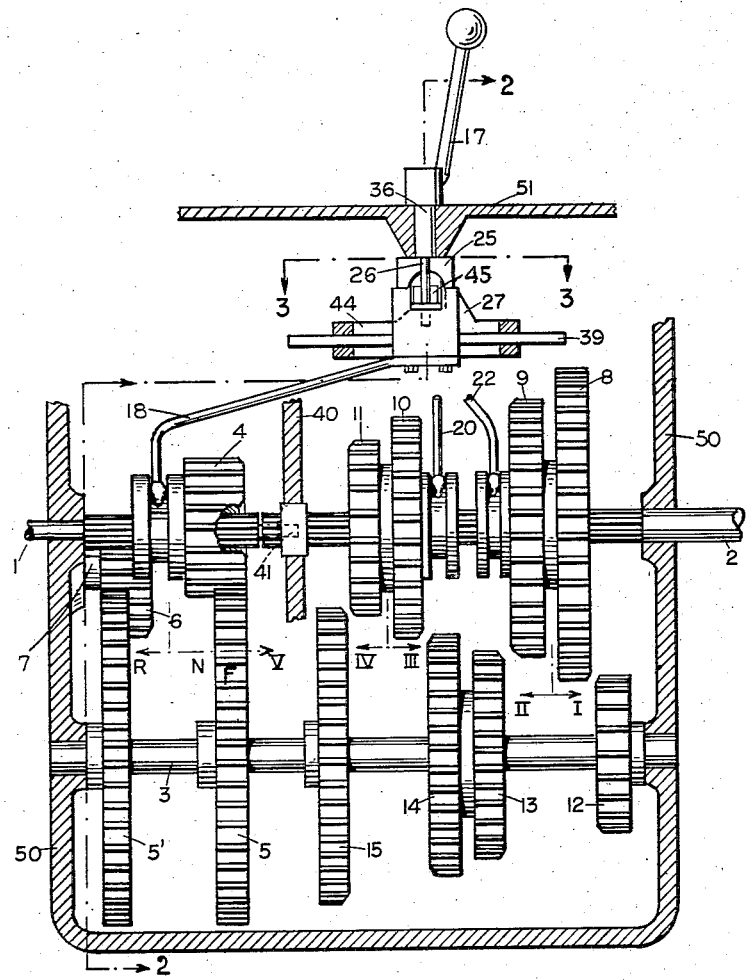
Fig. 1 is a cross-sectional view taken along line 1—1 of Fig. 2, illustrating a multi-speed transmission system according to the invention with five forward speeds and four reverse speeds.

In the drawing I show a reversible transmission system, comprising a housing having side walls 50 and a top wall 51; a splined input shaft 1 aligned with a splined output shaft 2, each of which is journaled in one of the side walls of the housing and is adapted to rotate independently of the other; and a pair of additional shafts 3, 7 journaled in the housing parallel to the two others. Stub shaft 7 carries an idler gear 6, while auxiliary shaft 3 has rigidly secured thereto and axially spaced therealong a pair of substantially identical reversing gears 5, 5'. Input shaft 1, which is connected to a source of torque such as an engine (not shown) external of the transmission system, carries a driving gear 4 axially displaceable along shaft 1 by a shifting fork 18 in a manner to be subsequently described. Gear 4, in a first or reverse position thereof, is adapted to engage the idler gear 6 which is in constant mesh with the reversing gear 5', thus constraining the gear 5' and the shaft 3 secured thereto to rotate in the same sense as input shaft 1. In a second, or neutral, axial position of gear 4, the gear is disengaged and shaft 3 remains at standstill; while in a third or forward position the gear 4 engages the reversing gear 5, thus causing the shaft 3 to rotate in the opposite sense. The auxiliary shaft 3 is further provided with four axially spaced speed-changing gears 15, 14, 13, 12 of successively smaller diameters, adapted to engage respectively an identical number of axially displaceable gears 11, 10, 9, 8 of successively larger diameters which are combined into two dual gears 11, 10 and 9, 8 carried on the output shaft 2, to drive the latter with four selectable speed ratios. The extremity of shaft 2 adjacent the input shaft 1 receives a reduced, cylindrical extension 41 of the latter and has an unsplined annular portion journaled in a partition 40 of the housing, the gear 4 upon approaching this partition bridging the two splined shafts so as to act as a coupling sleeve therebetween whereby, when this gear is displaced still further along the input shaft 1 from its normal forward position (in mesh with gear 5) into a fifth or high-speed forward position, the output shaft 2 is coupled directly to the input shaft 1. The sense of rotation of the output shaft will thus be determined by the axial positions of gear 4, while the output speeds of the shaft 2, depending of course on the gear ratios, will be greatest upon the direct coupling of the input and the output shafts 1 and 2 and will be successively less when gear 11 is meshed with gear 15, gear 10 with gear 14, gear 9 with gear 13, and gear 8 with gear 12.

Figure 4:
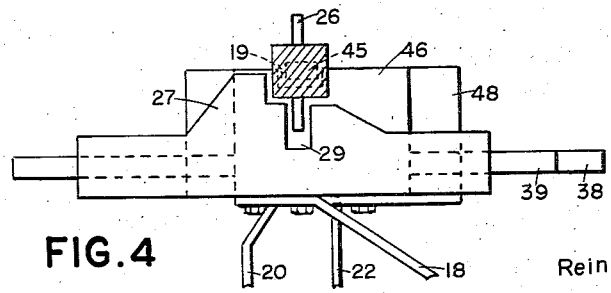
Fig. 4 is a cross-sectional view taken along line 4—4 of Fig. 2.
Figure 2:
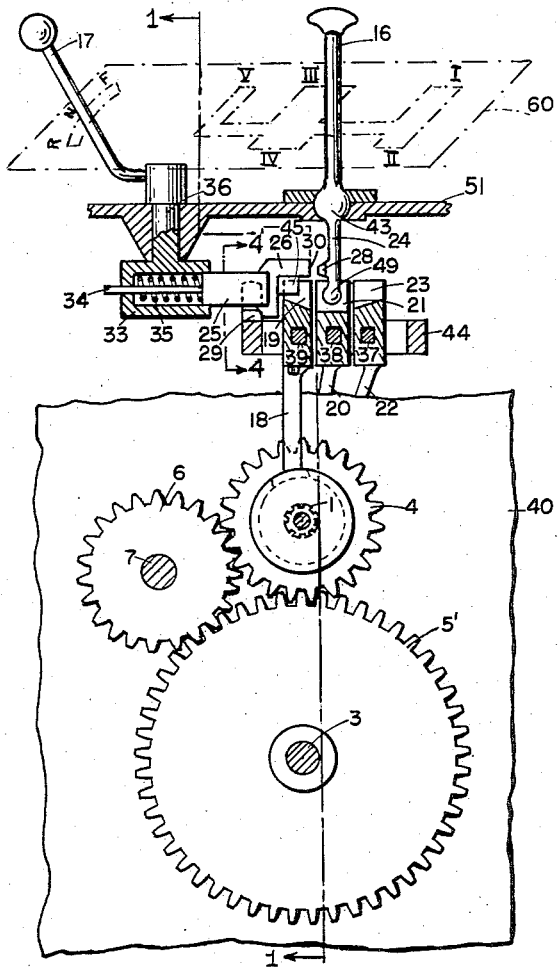
Fig. 2 is a cross-sectional view taken along line 2—2 of Fig. 1.
Figure 3:
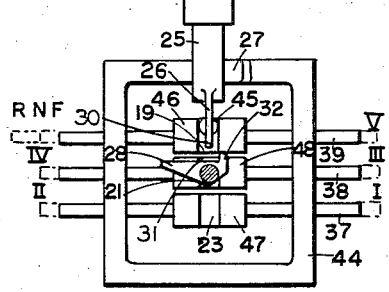
Fig. 3 is a cross-sectional view taken along line 3—3 of Fig. 1.

The gear-shifting means, best seen in Figs. 2, 3 and 4, comprises a rotatable lever 17, pivoted at 36 to the wall 51 of the housing, and an omnidirectionally swingable lever 16 connected to the housing at 43 in a ball-and-socket joint for unrestricted movement. Shift lever 17 is provided with a sleeve housing 33 in which is lodged a helical restoring spring 35 urging a stud 25 in an outward direction. The stud 25 is secured to a guide rod 34 passing through the rear wall of housing 33 to prevent the stud 25 from departing from its glide path into and out of the housing. The stud 25 is further provided with a guide plate 26 forming an abutment 30 which is engageable by the face 31 of a striker bar 28 secured to the lever 16 at its lower extremity 24. The guide plate 26 has secured thereto a knob 45, adapted to be received in a groove 19 provided in a shift block 46 which is connected with the shifting fork 18 of gear 4. The block 46 is rigid with a rail 39 passing through the frame 44 of the shifting device, thereby enabling the block 46 and, consequently, the fork 18 and the gear 4 to be shifted to the left or to the right from the position shown in Figs. 1 and 3. As can be seen from Fig. 2, I provide two additional blocks 48, 47, respectively possessing grooves 21, 23 and rails 38, 37, displaceable as described with respect to the block 46. The blocks 48, 47 have secured thereto forks 20 and 22 respectively engaging the dual gear 11, 10 and the dual gear 9, 8, being thus adapted to displace these gears to their left-hand or their right-hand positions as shown in Fig. 3. The lower portion 24 of lever 16 is provided with a knob 49 adapted to enter the grooves 19, 21 and 23 for the displacement of the blocks 46, 48 and 47 by that lever.

In the following description of the operation of the illustrated embodiment of my invention, the following symbols will designate the operating positions of the axially displaceable gears in Fig. 1, the lever positions with respect to the gating plate 60 in Fig. 2, and the positions of the shift blocks 46, 48 and 47 in Fig. 3, all of which are equivalent positions for each symbol: R is the reverse position; N, neutral; F, forward drive; I, first or low speed; II, second speed; III, third speed; IV, fourth speed; and V, fifth or high speed (direct coupling of the input shaft to the output shaft). As will be seen from Fig. 3, the normal position of the shift lever 17 is such that the block 46 is in the forward or F position, wherein gear 4 is meshed with gear 5, so that a torque applied to the input shaft 1 is in turn transmitted to the auxiliary shaft 3 which rotates in an opposite sense to the rotation of shaft 1. Gear-shift lever 16, therefore, may be positioned so that knob 49 enters either groove 21 or groove 23, displacing the block containing the engaged groove to the right or to the left (as viewed in Fig. 3) in order selectively to interconnect any of the four gear pairs 11 and 15, 10 and 14, 9 and 13, 8 and 12 in the respective positions IV, III, II, and I. In all of these positions, the output shaft 2 whereon the shiftable gears 11, 10, 9, and 8 are mounted will be constrained to rotate with a sense opposite to that of auxiliary shaft 3, and thus identical with the rotational direction of input shaft 1. Four forward speeds may be obtained therefore by this combination of positions of first lever 16 while the second lever 17 is in the forward position.

The block 46 and consequently gear 4 may be moved to the neutral or N position by a clockwise rotation of lever 17 about the pivot 36, whereby input gear 4 is completely disengaged and no transmission of torque is accomplished.

The block 46 may be displaced further to the left (as seen in Figs. 1 and 3) to the reverse or R position by continued clockwise movement of the lever 17. In the reverse position, gear 4 engages idler gear 6 which is in constant mesh with reversing gear 5', thus rotating the latter and the auxiliary shaft 3 keyed thereto in the same sense as the rotation of gear 4. Once again the lever 16 may select a speed as described above so that the load (not shown) entrained by the output shaft 2 rotates in an opposite sense to the auxiliary shaft 3 and therefore also in an opposite or reverse sense relative to the input shaft 1. Thus the output shaft 2 may be operated in the reverse direction with the same four speeds as in the forward direction.

In order to shift the transmission to high-speed forward gear, the shift lever 17 is returned to the forward or F position in which it is held against further counterclockwise motion by a stop 27 provided on the frame 44. In this position, of course, gear 4 is meshed with gear 5 as described above. The lever 16 may now be shifted within the gate plate 60 so that the knob 49 may enter groove 19 of shifting block 46. At this moment, the striker bar 28 carried on lower portion 24 of lever 16 contacts the abutment 30 of plate 26, thereby displacing the latter together with the stud 25 to the left (as viewed in Fig. 2) against the force of restoring spring 35. The lower portion of plate 26 enters a slot 29 provided therefor in frame 44, as best seen in Figs. 2 and 3, while the knob 45 is withdrawn from the groove 19, thus permitting the block 46 to be displaced to its right-hand position V (as viewed in Fig. 3). The entry of plate 26 into slot 29 prevents the accidental or intentional shifting of lever 17 while the block is in this right-hand (V) position. The striker bar 28 is provided with a hooked extension 32 adapted to check any displacement of the block 46 to the left when the latter is engaged by lever 16. The extension 32 is so dimensioned as to be engaged by plate 26 should there be an attempt to displace the block 46 to the left, beyond position F, by the lever 16. When the block 46 is moved to position V from its normal forward or F position shown in Fig. 3, the gear 4 is shifted further to the right (Fig. 1) to bridge the shafts 1 and 2 as previously described, thereby effecting a direct coupling of the input shaft 1 to the output shaft 2 and, therefore, a high-speed direct drive of the load. Since only lever 16 may shift the block 46 into the high-speed position V, it will be unable to act simultaneously on the speed-change gears 11, 10, 9, and 8 through block 47 or 48, thus obviating the need for auxiliary lock-out devices to prevent non-compatible gear meshings. When it is desired to reduce speed, the knob 49 is withdrawn from groove 19 and moved to groove 21 or to groove 23 so that the normal speed change may be accomplished as described hereinabove, while the knob 45 re-enters the groove 19 under the urging of spring 35 so that the lever 17 regains regulatory control of the block 46. It will be understood that, at the same time, plate 26 has been withdrawn from slot 29, permitting the lever 17 to rotate clockwise to all the operative positions thereof, and that the gear 4 has left the shaft 2 in returning to its normal forward position F, from which it may be further shifted to positions N and R.

My invention may, of course, be modified in structure, as by providing the gear 4 with jaw-clutch teeth for cooperation with a complementary clutch member on shaft 2, e.g. as shown for the members 12, 16 in my co-pending application Ser. No. 727,922, in lieu of the direct bridging of the shafts 1 and 2. Also, the number of speed-changing gear pairs 11, 15 etc. may be increased or decreased, and the two reversing gears 5, 5' may be made unequal if it is not desired to have the same speed ratios available for forward and reverse travel. Furthermore, the splines on shafts 1 and 2 are representative of any key means allowing the axial shifting of a gear thereon while securing such gear for positive rotary entrainment of or by its shaft. Finally, it will be understood that suitable anti-friction bearings may be mounted on the walls 40, 50 to accommodate the several shafts, as also on the left-hand end of shaft 2 for the extension 41 of shaft 1. These and other modifications are intended to be embraced in the spirit and scope of the invention except as otherwise limited in the appended claims.

I claim:

1. A transmission system comprising an input shaft, an output shaft, an auxiliary shaft parallel to said input and output shafts, a set of first speed changing gears of different diameters on said output shaft, a set of second speed-changing gears complementary to said first gears on said auxiliary shaft, the gears of one of said sets being axially shiftable on their shaft, first shift means in operative engagement with said shiftable gears for selectively meshing any one of them with the complementary gear of the other set, a driving gear on said input shaft in positive rotary engagement therewith but with freedom of axial displacement thereon, a first and a second reversing gear on said auxiliary shaft, an idler gear in constant mesh with said first reversing gear, and second shift means for displacing said driving gear between a first position in mesh with said idler gear and a second position in mesh with said second reversing gear.

2. A system according to claim 1 wherein said reversing gears are of like diameter.

3. A system according to claim 1 wherein said input and output shafts are coaxial, said driving gear being displaceable by one of said shift means into a third position in which said driving gear positively engages said output shaft whereby the latter is directly entrained by said input shaft.

4. A system according to claim 3 wherein said first shift means is operable in a predetermined position of said driving gear to engage the latter for displacing it to said third position.

5. A system according to claim 4 wherein said driving gear is provided with an operating element normally coupled with said second shift means but disengageable therefrom by said first shift means upon the establishment of an operative connection between said first shift means and said member.

6. A system according to claim 4 wherein said first shift means is positioned to separate all of said first speed-changing gears from all of said second speed-changing gears upon its engagement with said driving gear.

7. A system according to claim 4 wherein said predetermined position is said second position.

8. A system according to claim 7 wherein said driving gear is provided with a neutral position between said first and second positions, said driving gear being disengaged from said idler gear and from said second reversing gear in said neutral position.

9. A system according to claim 3 wherein one of said coaxial shafts has an extremity rotatably received in the other coaxial shaft.

10. A transmission system comprising an input shaft, an output shaft coaxially adjoining said input shaft, a driving gear axially displaceable on said input shaft, key means on said input shaft securing said driving gear against rotation relative thereto, an auxiliary shaft and a further shaft parallel to each other and to said input and output shafts, speed-changing means on said output and auxiliary shafts adapted to interconnect same with a variable speed ratio, a first shift member operatively connected with said speed-changing means for varying said speed ratio, a first and a second reversing gear on said auxiliary shaft, idler-gear means on said further shaft in constant mesh with said first reversing gear, said driving gear having a reverse position in mesh with said idler-gear means, an intermediate position out of mesh with any other gear, a forward position in mesh with said second reversing gear, and a further position beyond said forward position adjacent the junction of said input and output shafts, a second shift member for selectively displacing said driving gear between said reverse, intermediate and forward positions, and means including one of said shift members for displacing said driving gear from said forward position to said further position, said output shaft being provided with a formation engageable by said driving gear in said further position for direct entrainment of said output shaft by said input shaft.

11. A system according to claim 10 wherein said input and output shafts are splined.

12. A system according to claim 11 wherein said speed-changing means comprises a set of axially shiftable gears of different diameters on said output shaft and a set of fixed gears respectively complementary to said shiftable gears on said auxiliary shaft.

13. A system according to claim 11 wherein said driving gear is simultaneously engageable with the splines of both said input shaft and said output shaft in said further position.

14. A system according to claim 10 wherein said first shift member is displaceable in a direction transverse to said shafts while in a neutral position in which said speed-changing means decouples said output shaft from said auxiliary shaft, said first member being further displaceable in an axial sense from said neutral position for operating said speed-changing means in accordance with a selected speed ratio, said driving gear being provided with an operating element normally engaged by said second shift member for displacement thereby between three axially spaced positions respectively corresponding to said reverse, intermediate and forward positions, said operating element in the third of said axially spaced positions being disposed for operative engagement by said first shift member in the neutral position of the latter, said first shift member being transversely displaceable in its neutral position for engaging said operating element and, upon such displacement, being axially movable for shifting said driving gear from said forward to said further position.

15. A system according to claim 14 wherein said operating element is provided with a transverse slot, said second shift member being provided with an extension normally engaging said slot, said first shift member having an extremity adapted in said neutral position to expel said extension from said slot while entering the latter, thereby disengaging said operating element from said second shift member.

16. A system according to claim 15, further comprising resilient means on said second shift member urging said extension into said slot upon alignment therewith.

17. A system according to claim 15, further comprising stationary locking means contacting said extension upon expulsion of the latter from said slot, said locking means upon such contact preventing axial displacement of said extension.

18. A system according to claim 17 wherein said extension is provided with abutment means engaging said extremity upon entry of the latter in said slot, said abutment means by such engagement preventing axial displacement of said first shift member in a sense returning said driving gear to its intermediate and reverse positions.

19. A system according to claim 15 wherein said operating element comprises an axially slidable first block and a gear-shifting arm for said driving gear secured to said block, said block being provided with said slot, said speed-changing means including a plurality of shiftable gears and a plurality of additional blocks axially slidable adjacent said first block and provided with respective gear-shifting arms for said shiftable gears, said additional blocks having slots aligned with one another and with the slot of said first block upon said driving gear occupying said forward position and said speed-changing means being in its decoupled state.

20. A system according to claim 14 wherein said first shift member comprises an omnidirectionally swingable lever, said second shift member comprising a rotatably pivoted lever.

References Cited in the file of this patent

UNITED STATES PATENTS

| | | |
|---|---|---|
| 1,958,607 | Burtnett | May 15, 1934 |
| 2,334,958 | Rohkar | Nov. 23, 1943 |
| 2,456,894 | Ryker | Dec. 21, 1948 |